(12) United States Patent
Ellis

(10) Patent No.: US 8,909,128 B2
(45) Date of Patent: Dec. 9, 2014

(54) RADIO DEVICE WITH VIRTUALLY INFINITE SIMULTANEOUS INPUTS

(75) Inventor: Michael D. Ellis, Boulder, CO (US)

(73) Assignee: 3D Radio LLC, Boulder, CO (US)

(*) Notice: Subject to any disclaimer, the term of this patent is extended or adjusted under 35 U.S.C. 154(b) by 824 days.

(21) Appl. No.: 12/420,670

(22) Filed: Apr. 8, 2009

(65) Prior Publication Data

US 2009/0258619 A1    Oct. 15, 2009

Related U.S. Application Data

(60) Provisional application No. 61/043,597, filed on Apr. 9, 2008.

(51) Int. Cl.
| | |
|---|---|
| *H04H 60/27* | (2008.01) |
| *H04B 1/18* | (2006.01) |
| *H04B 1/16* | (2006.01) |
| *G11B 20/10* | (2006.01) |
| *G11B 20/00* | (2006.01) |

(52) U.S. Cl.
CPC ........ *H04B 1/16* (2013.01); *G11B 2020/00057* (2013.01); *G11B 20/10527* (2013.01); *G11B 2020/10546* (2013.01)
USPC ................... 455/3.04; 455/179.1; 455/186.1; 369/7

(58) Field of Classification Search
USPC ................ 369/1, 5–7, 13.01; 375/144, 148; 455/3.01, 3.02, 3.04, 132, 140, 150.1, 455/161.1, 179.1, 186.1, 344, 345
See application file for complete search history.

(56) References Cited

U.S. PATENT DOCUMENTS

| | | | |
|---|---|---|---|
| 2,097,901 A | 11/1937 | Thomas | 455/172.1 |
| 4,031,334 A | 6/1977 | Kimura et al. | 369/7 |
| 4,109,115 A | 8/1978 | Yamamoto | 369/7 |
| 4,268,724 A | 5/1981 | Hubbard | 369/7 |
| 4,591,661 A | 5/1986 | Benedetto et al. | 455/556.1 |
| 4,677,466 A | 6/1987 | Lert et al. | 725/22 |

(Continued)

FOREIGN PATENT DOCUMENTS

| | | |
|---|---|---|
| GB | 2313 216 | 11/1997 |
| WO | WO 99 45700 | 9/1999 |

(Continued)

OTHER PUBLICATIONS

Louderback, "Improve Your Commute with Audio on Demand," ZDTV, 'Online! (Nov. 1999) (available at: http://www.zdnet.com/anchordesk/story/story_4066.html).

(Continued)

*Primary Examiner* — Levi Gannon
(74) *Attorney, Agent, or Firm* — Winston & Strawn LLP

(57) ABSTRACT

A method, system, media, and apparatus are directed to radio recording. Radio stations are simultaneously recorded based on a radio parameter including a processing parameter, a memory usage or allocation, a recording status, or the like. The radio parameter is adapted for an individual station, some radio stations, or all radio stations. The processing parameter is adapted based on a processor usage. The memory usage is adapted based on a memory requirement of a station being recorded. A station may be suspended from recording based on a loss of a signal and resumed based on a resumption of the signal. An access to a radio content recorded while a signal was available may be provided, if the signal is unavailable. The plurality of stations may be prioritized.

34 Claims, 4 Drawing Sheets

(56) References Cited

U.S. PATENT DOCUMENTS

| | | | |
|---|---|---|---|
| 4,682,370 A | 7/1987 | Matthews | 455/166 |
| 4,787,063 A | 11/1988 | Muguet | 386/299 |
| 4,953,212 A | 8/1990 | Otsubo | 381/1 |
| 5,119,507 A | 6/1992 | Mankovitz | 455/154.1 |
| 5,187,589 A | 2/1993 | Kono et al. | 386/83 |
| 5,214,792 A | 5/1993 | Alwadish | 455/45 |
| 5,239,540 A | 8/1993 | Rovira et al. | 370/345 |
| 5,243,640 A | 9/1993 | Hadley et al. | 455/426.1 |
| 5,253,066 A | 10/1993 | Vogel | 725/28 |
| 5,345,430 A | 9/1994 | Moe | 369/7 |
| 5,371,551 A | 12/1994 | Logan et al. | 348/571 |
| 5,404,588 A | 4/1995 | Henze | 455/186.1 |
| 5,406,558 A | 4/1995 | Rovira et al. | 370/326 |
| 5,448,534 A | 9/1995 | Okada | 369/7 |
| 5,457,815 A | 10/1995 | Morewitz, II | 455/161.1 |
| 5,463,599 A | 10/1995 | Yifrach et al. | 369/7 |
| 5,513,385 A | 4/1996 | Tanaka | 455/228 |
| 5,612,729 A | 3/1997 | Ellis et al. | 725/22 |
| 5,671,195 A | 9/1997 | Lee | 269/7 |
| 5,742,893 A | 4/1998 | Frank | 455/66.1 |
| 5,774,798 A | 6/1998 | Gaskill | 455/186.1 |
| 5,778,137 A | 7/1998 | Nielsen et al. | 386/68 |
| 5,818,441 A | 10/1998 | Throckmorton et al. | 715/717 |
| 5,867,794 A | 2/1999 | Hayes et al. | 455/557 |
| 5,914,941 A | 6/1999 | Janky | 370/313 |
| 5,978,689 A | 11/1999 | Tuoriniemi et al. | 455/569.1 |
| 5,986,650 A | 11/1999 | Ellis et al. | 725/40 |
| 6,074,553 A | 6/2000 | Haski | 210/167.2 |
| 6,088,455 A | 7/2000 | Logan et al. | 380/200 |
| 6,134,426 A | 10/2000 | Volkel | 455/161.3 |
| 6,169,843 B1 | 1/2001 | Lenihan et al. | 386/46 |
| 6,209,787 B1 | 4/2001 | Iida | 235/381 |
| 6,212,359 B1 | 4/2001 | Knox | 725/135 |
| 6,233,389 B1 | 5/2001 | Barton et al. | 386/46 |
| 6,236,674 B1 | 5/2001 | Morelli et al. | 375/219 |
| 6,259,441 B1 | 7/2001 | Ahmad et al. | 345/720 |
| 6,275,268 B1 | 8/2001 | Ellis et al. | 348/564 |
| 6,327,418 B1 | 12/2001 | Barton | 386/46 |
| 6,337,719 B1 | 1/2002 | Cuccia | 348/731 |
| 6,356,704 B1 | 3/2002 | Callway et al. | 386/94 |
| 6,400,996 B1 | 6/2002 | Hoffberg et al. | 700/83 |
| 6,407,750 B1 * | 6/2002 | Gioscia et al. | 715/716 |
| 6,421,453 B1 | 7/2002 | Kanevsky et al. | 382/115 |
| 6,452,960 B1 | 9/2002 | Sato | 375/140 |
| 6,507,727 B1 | 1/2003 | Henrick | 455/3.06 |
| 6,564,003 B2 | 5/2003 | Marko et al. | 386/69 |
| 6,588,015 B1 | 7/2003 | Eyer et al. | 725/89 |
| 6,607,136 B1 | 8/2003 | Atsmon et al. | 235/492 |
| 6,630,963 B1 | 10/2003 | Billmaier | 348/515 |
| 6,658,247 B1 | 12/2003 | Saito | 455/412.1 |
| 6,710,815 B1 | 3/2004 | Billmaier et al. | 348/515 |
| 6,721,236 B1 | 4/2004 | Eschke et al. | 369/6 |
| 6,725,002 B2 | 4/2004 | Sakurai et al. | 399/111 |
| 6,725,022 B1 | 4/2004 | Clayton et al. | 455/154.1 |
| 6,769,028 B1 | 7/2004 | Sass et al. | 709/231 |
| 6,785,656 B2 | 8/2004 | Patsiokas et al. | 704/500 |
| 6,792,296 B1 | 9/2004 | Van Bosch | 455/569.2 |
| 6,829,475 B1 * | 12/2004 | Lee et al. | 455/419 |
| 6,850,252 B1 | 2/2005 | Hoffberg | 715/9 |
| 6,895,165 B2 | 5/2005 | Boys | 386/46 |
| 6,931,451 B1 * | 8/2005 | Logan et al. | 709/231 |
| 6,944,430 B2 * | 9/2005 | Berstis | 455/186.1 |
| 6,952,576 B2 | 10/2005 | Fish et al. | 455/414.1 |
| 6,961,585 B2 | 11/2005 | Minematsu | 455/556.1 |
| 7,028,323 B2 | 4/2006 | Franken et al. | 725/9 |
| 7,058,376 B2 * | 6/2006 | Logan et al. | 455/186.1 |
| 7,065,342 B1 | 6/2006 | Rolf | 455/412.1 |
| 7,095,688 B2 | 8/2006 | Kondo et al. | 369/47.33 |
| 7,107,063 B1 | 9/2006 | Bates et al. | 455/456.1 |
| 7,171,174 B2 * | 1/2007 | Ellis et al. | 455/132 |
| 7,177,608 B2 | 2/2007 | Herz et al. | |
| 7,213,075 B2 | 5/2007 | Feig | 709/231 |
| 7,231,198 B2 | 6/2007 | Loughran | 455/343.2 |
| 7,277,562 B2 | 10/2007 | Zyzdryn | 382/124 |
| 7,295,904 B2 | 11/2007 | Kanevsky et al. | 701/36 |
| 7,313,375 B2 | 12/2007 | Lee et al. | 455/186.1 |
| 7,327,859 B1 | 2/2008 | Chau | 382/116 |
| 7,343,141 B2 * | 3/2008 | Ellis et al. | 455/132 |
| 7,418,277 B2 | 8/2008 | Tsai | 455/569.2 |
| 7,474,773 B2 | 1/2009 | Chau | 382/124 |
| 7,627,560 B2 * | 12/2009 | Watanabe et al. | 1/1 |
| 7,668,576 B2 | 2/2010 | Ellengogen et al. | 455/575.1 |
| 7,742,458 B2 | 6/2010 | Sharma et al. | 370/347 |
| 7,937,119 B2 | 5/2011 | Arai | 455/574 |
| 8,165,644 B2 | 4/2012 | Syed | 455/474 |
| 8,411,606 B2 | 4/2013 | Chen et al. | 370/311 |
| 2001/0047379 A1 | 11/2001 | Jun et al. | 709/1 |
| 2002/0045438 A1 | 4/2002 | Tagawa et al. | 455/412 |
| 2002/0057380 A1 | 5/2002 | Matey | 348/731 |
| 2002/0111703 A1 | 8/2002 | Cole | 700/94 |
| 2002/0174430 A1 | 11/2002 | Ellis et al. | 725/46 |
| 2002/0186957 A1 | 12/2002 | Yuen | 386/46 |
| 2003/0013425 A1 | 1/2003 | Nee | 455/186.1 |
| 2003/0095791 A1 | 5/2003 | Barton et al. | 386/83 |
| 2003/0163823 A1 | 8/2003 | Logan et al. | 725/89 |
| 2003/0208771 A1 | 11/2003 | Hensgen et al. | 725/100 |
| 2004/0029541 A1 | 2/2004 | Baranowski et al. | 455/130 |
| 2004/0128692 A1 | 7/2004 | Wolfe et al. | 725/89 |
| 2004/0158748 A1 | 8/2004 | Ishibashi et al. | 713/300 |
| 2005/0005298 A1 | 1/2005 | Tranchina | 725/81 |
| 2005/0014495 A1 | 1/2005 | Shanahan | 455/419 |
| 2005/0020223 A1 | 1/2005 | Ellis et al. | 455/186.1 |
| 2005/0049750 A1 | 3/2005 | Parker et al. | 700/258 |
| 2005/0064835 A1 | 3/2005 | Gusler et al. | 455/245.1 |
| 2005/0085217 A1 | 4/2005 | Lim | 455/410 |
| 2005/0229213 A1 | 10/2005 | Ellis et al. | 725/58 |
| 2006/0008243 A1 * | 1/2006 | Przybylek | 386/46 |
| 2006/0026637 A1 | 2/2006 | Gatto et al. | 725/37 |
| 2006/0082690 A1 | 4/2006 | Englert | 348/731 |
| 2006/0083253 A1 | 4/2006 | Park et al. | 370/401 |
| 2006/0085115 A1 | 4/2006 | Ilan et al. | 701/49 |
| 2006/0149971 A1 | 7/2006 | Kozlay | 713/186 |
| 2007/0064157 A1 | 3/2007 | Kasamatsu | 348/730 |
| 2007/0130280 A1 | 6/2007 | Park et al. | 709/208 |
| 2008/0027586 A1 | 1/2008 | Hern et al. | 700/284 |
| 2008/0045170 A1 | 2/2008 | Howley et al. | 455/186.1 |
| 2008/0165758 A1 | 7/2008 | Kato et al. | 370/347 |
| 2008/0192994 A1 | 8/2008 | Chau | 382/124 |
| 2008/0204604 A1 | 8/2008 | Campbell | 348/731 |
| 2008/0320523 A1 | 12/2008 | Morris et al. | 725/47 |
| 2009/0174822 A1 | 7/2009 | Pugel | 348/731 |
| 2009/0313660 A1 | 12/2009 | Ni et al. | 725/78 |
| 2010/0120366 A1 | 5/2010 | DeBiasio et al. | 455/41.3 |
| 2012/0237092 A1 | 9/2012 | Bechtel | 382/126 |
| 2013/0053007 A1 | 2/2013 | Cosman et al. | 455/414.3 |

FOREIGN PATENT DOCUMENTS

| | | |
|---|---|---|
| WO | WO 99 45701 | 9/1999 |
| WO | WO 99 66725 | 12/1999 |
| WO | WO 00 13416 | 3/2000 |
| WO | WO 00 16548 | 3/2000 |
| WO | WO 00 13415 | 6/2000 |
| WO | WO 00 45511 | 8/2000 |
| WO | WO 01 76248 | 10/2001 |

OTHER PUBLICATIONS

International Search Report, application No. PCT/US02/05039, mailed Feb. 4, 2003.

"Federal Standard 1037C Telecommunications: Glossary of Telecommunication Terms," http://www.its.bldrdoc.gov/fs-1037, 8 pgs., Aug. 7, 1996.

* cited by examiner

RADIO DEVICE WITH VIRTUALLY INFINITE SIMULTANEOUS INPUTS

RELATED APPLICATIONS

This application claims the benefit of Provisional Patent Application No. 61/043,597 filed Apr. 9, 2008 entitled "RADIO DEVICE WITH VIRTUALLY INFINITE SIMULTANEOUS INPUTS RELATED APPLICATIONS" which is incorporated herein by reference.

FIELD OF INVENTION

This invention relates to radio systems and methods. In particular this invention relates to receiving radio signals from a plurality of radio inputs.

BACKGROUND OF THE INVENTION

U.S. Pat. No. 7,171,174, issued Jan. 30, 2007, and U.S. Pat. No. 7,343,141, issued Mar. 11, 2008, which are hereby explicitly incorporated by reference herein in their entirety illustratively disclose multi-tuner radio products and features. Multi-tuner radio receivers such as disclosed in the '141 patent simultaneously and continuously monitor and record all of the listener's favorite stations. This allows the listener to easily access content on any of these stations, even if the content from that station is not currently being output. It also allows the listener to easily replay radio content that was previously broadcast, as well as skip over content that is not of interest.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION

Current multi-tuner radio devices that use hardware tuners to receive each independent radio station are limited in the number of stations that can be monitored simultaneously. By using software-defined radio tuners, adaptive receiving and compressions algorithms, and extendable hardware, the number of radio stations that can be simultaneously received may be increased significantly. This may even be to the point where the radio device is able to simultaneously monitor and record all available radio stations in which the listener may be interested, thus becoming a "virtually infinite radio" (VIR). In addition, the cost of such a device may be significantly reduced and its flexibility may be greatly increased.

As used herein, the terms "enable a user" or "enabling a user" to perform a function refers to providing a hardware and/or hardware component or configuration to perform that function.

Generally, the present invention is directed to radio recording. Radio stations are simultaneously recorded based on a radio parameter including a processing parameter, a memory usage or allocation, a recording status, or the like. The radio parameter is adapted for an individual station, some radio stations, or all radio stations. The processing parameter is adapted based on a processor usage. The memory usage is adapted based on a memory requirement of a station being recorded. A station may be suspended from recording based on a loss of a signal and resumed based on a resumption of the signal. An access to a radio content recorded while a signal was available may be provided, if the signal is unavailable. The plurality of stations may be prioritized.

Figure 1:
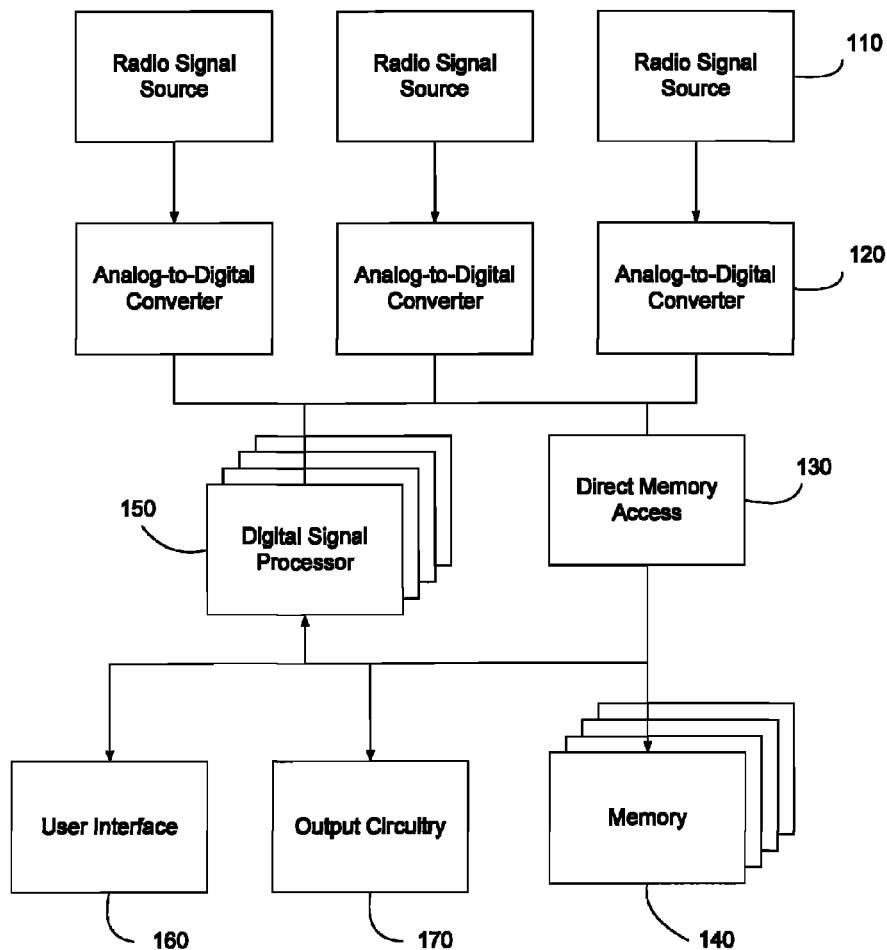
FIG. 1 shows a block diagram of one implementation of a "virtually infinite radio" (VIR)

FIG. 1 shows a block diagram of one implementation of a VIR. Radio signal sources 110 may be hardware required to receive radio signals from different sources. This may include, for example, an AM antenna, an FM antenna, a satellite antenna, an Internet receiver, a wireless Internet receiver, a 700 MHz wireless receiver, a Bluetooth receiver, or any other suitable signal receiving device or circuitry. Additional circuits may be included, for example, amplifiers and filters. Analog-to-digital converters 120 may be included for each source to convert any received analog signal to digital for processing. If desired, direct memory access (DMA) device 130 may be included to store the digital radio signals into memory device 140. In some implementations, digital signal processor 150 may receive the converted digital radio signal and store the data into memory 140. If desired, multiple memory devices 40 may be included, and may be of any suitable type (for example, dynamic RAM, static RAM, flash memory, disk drive, or any suitable combination).

Digital signal processors 150 may include one or more high-performance digital signal processors. If multiple processors are included, they may be configured to allow or otherwise enable easily partitioning processing tasks between them. For example, each processor may take on a specific number of stations (e.g., one quarter of the monitored stations if there are four processors) or a specific set of tasks (e.g., one processor may handle tuning functions, another may handle compression, a third may handle audio output and user interface). Examples of processors that may be used include the Freescale MSC8144 high-performance four-core fixed-point processor operating at 1 GHz; the Analog Devices ADSP-TS201 TigerSHARC high-performance, floating-point processor operating at 600 MHz; or the Texas Instruments TMS320C6727 high-performance, floating-point processor operating at 350 MHz.

In addition to processing of the monitored radio signals, the processors 150 may handle the audio output 170 and the user input/output 160. User interface 160 may include any suitable circuit or circuits, such as buttons, voice input, gesture recognition, fingerprint recognition, and display devices. Processors 150 may also control other devices and functions, including GPS, CD, mobile phone, removable memory, and any other suitable functions.

Figure 2:
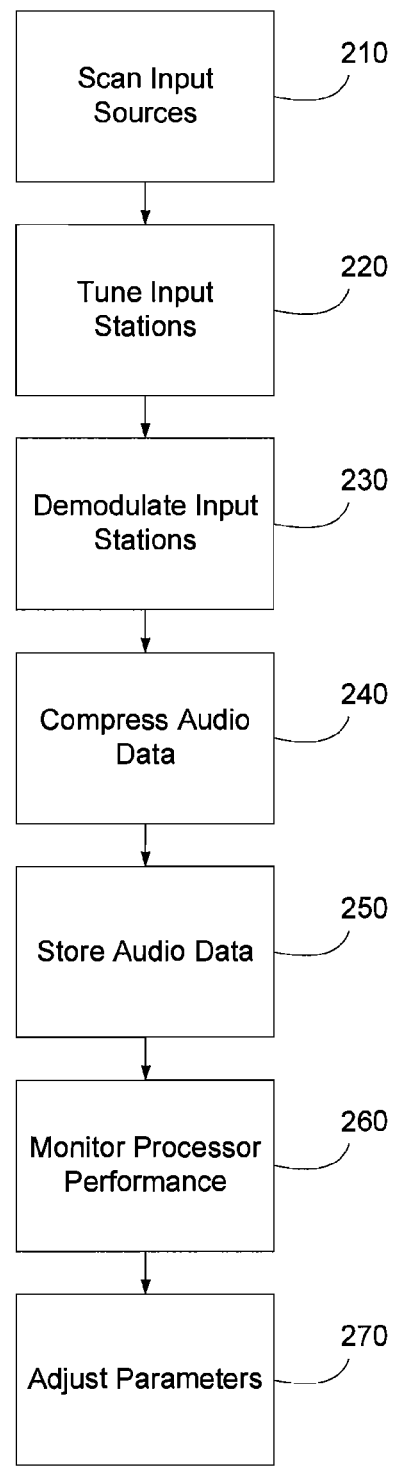
FIG. 2 shows a process for processing incoming radio signals.

FIG. 2 shows a process for processing incoming radio signals. In one embodiment, the process of FIG. 2 may be performed by DSP 150 of FIG. 1. The steps shown may be performed in an alternative order, steps may be omitted, and steps may be added as appropriate.

In step 210, processor 150 may scan the stored digitized signal from radio signal source 110. The purpose of this scanning step may be to determine the presence or absence (and other characteristics, such as signal strength) of stations at specific frequencies within the incoming signal. This may be based on prior knowledge of the modulation format expected to be used, based on the input source (e.g., the input antenna) and the frequency. For example, the incoming signal from an FM antenna may be scanned at 0.2 MHz intervals between 87.5 MHz and 108.0 MHz using FM demodulation. The scanning may be performed for each input source 110 and associated modulation type at any suitable interval, for example once per minute. An example of a commercial system that performs multi-channel radio monitoring is the WiN-RADIO MS-8108 Multichannel Radio Monitoring System.

If radio content is found at any frequency, processor 150 may check to see if that frequency is currently being monitored. If it is, monitoring may continue for that station. If the station has not previously been found, the station may be added to those to be monitored. If the station had previously been found but is not currently being monitored because its signal had temporarily not been found, monitoring may resume for that station. If a station is not found at a frequency that is currently being monitored, then monitoring and storing on that station may be temporarily suspended.

An advantage of being able to suspend and resume monitoring and recording of radio stations as their signals come and go is that it allows or otherwise enables a user (particularly in a mobile environment such as a car radio) to listen to content from a radio station even after going out of range.

In step 220 the stations that are currently available are tuned. Processor 150 uses a software-defined radio (SDR) algorithm to extract the radio signal at the specified frequency. An example of a commercial product that performs SDR is the WiNRADIO WR-G305i PC-based wideband scanning receiver. This step may also be combined with step 230, demodulation of the radio signal. With at least one source, the audio data may be transmitted in a digital format, in which cases the demodulation may include extraction of the encoded audio data from the signal. The output of these steps may be a digitized stereo audio stream (e.g., data stream). These two steps may be performed in parallel for each of the monitored stations from each of the input sources, using parallel software processes that may be performed on a signal processor or spread out across multiple processors. These steps may be performed continuously, based on the digital sampling frequency of the input radio signal. Step 240, compression of the audio data, may optionally be performed to reduce the volume of data using any suitable compression technique, such as MP3 encoding. In some cases, the data may have been transmitted digitally already compressed, in which case compression may not be necessary. After compression, the data may be stored into memory 140 in step 250.

In step 260, the performance of processor 150 may be monitored. For example, processor 150 may include an idle task or an idle loop, and it may measure how much time is spent in that task or loop. The addition and removal of stations to be monitored may be controlled, so that the effect on processor utilization may be measured. In one embodiment, only one station may be added or removed at a time. In some embodiments, processor utilization monitoring may include counting the number of stations being monitored and/or estimating the number of parallel monitoring streams that can be handled by each processor. In some embodiments step 260 may also include monitoring of memory usage. Step 260 may occur at any suitable interval, such as once per minute, as well as whenever a station is added to or removed from the set of stations to be monitored.

When a new station is added and processor utilization increases above a predetermined threshold, or when a station is removed and/or processor utilization drops below a second threshold, processing parameters may be adjusted in step 270. When processor 150 is close to full utilization, algorithmic changes may be made to reduce the requirements on the processor, so that additional stations may be added. If a station is dropped, changes may be made to take advantage of more processor availability. Changes may include:

The sampling frequency of the raw radio signal

The sample size (number of bits per sample) of the raw radio signal

The sampling frequency or sample size of the output audio signal

The compression algorithm used (or it may be disabled completely)

Level of compression used for a particular algorithm (higher compression may use more processing power)

Amount of memory devoted to the storage of audio data from each monitored (or suspended) station Any of these factors may be adjusted on a station-by-station basis. For example, stations that the user has designated as favorites may be allocated more processing power and more memory than stations that the user may not listen to, which may be removed completely from monitoring.

Figure 3:
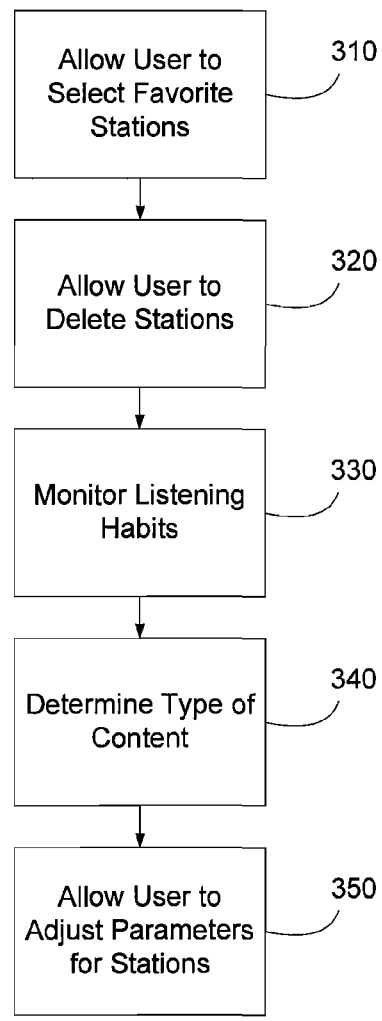
FIG. 3 shows a process for prioritizing stations in order to adjust processing parameters associated with the stations.

FIG. 3 shows a process for prioritizing stations in order to adjust processing parameters associated with the stations. In one embodiment, the process of FIG. 3 may be performed by DSP 150 of FIG A. The steps shown may be performed in an alternate order, steps may be omitted, and steps may be added as appropriate.

In step 310, the listener may be allowed or otherwise enabled to select favorite stations. In some embodiments, this may be done by allowing the user to select up to at least a fixed, pre-determined, selectable, or adaptable number of preset stations that can be selected easily by at least a single input command. In other embodiments, the user may be allowed or otherwise enabled to rate stations with a level or preference. Favorite stations may be allocated more memory, and may be used to generate higher quality audio (e.g., with a higher sample rate, larger sample size, or increased bits per second compression algorithm). Conversely, a station rated with a lower preference level may be allocated less memory and may be used to generate lower quality audio.

In step 320, the user may be allowed or otherwise enabled to delete stations. Deleting a station may remove its input from monitoring and storing. The user may be allowed or otherwise enabled to listen to a deleted station, but may be disabled from performing one, some, or any functions on that station that may require access to stored audio (such as skipping back in time).

In step 330, processor 150 may monitor the listening habits of the user. In this manner, favorite stations may be determined and stations that may not be accessed (e.g., not accessed for year, month, week, etc.) may also be determined. Processing parameters associated with these stations may be automatically adjusted.

In step 340, the type of content may be determined. For example, a station may be classified as popular music, sports, classical music, talk, or any other suitable category. This determination may be made based on manual classification or automatically based on analysis of the audio content. The processing parameters may be adjusted based on the category. For example, a station that broadcasts primarily talk programming may require lower quality audio than a station that broadcasts classical music. A user may also specify preferences for specific categories, and these preferences may be used to adjust the parameters or remove stations form the monitoring list. Other attributes of the station may also be used to determine appropriate processing parameters. For example, a station that broadcasts in mono or that often has poor reception may be given a lower audio quality, while one that broadcasts in HD may be assigned more memory.

In step 350, the listener may be allowed or otherwise enabled to adjust at least one of the processing parameters for individual stations. For example, the user may be allowed or otherwise enabled to assign a High, Medium, or Low audio quality to a station, which may impact the setting of sampling rate, sample size, and compression algorithm parameters. The user may also be allowed or otherwise enabled to select the number of minutes or hours of audio data to store for any individual station. Stations for which the user has not made any settings may revert to a default setting, or a setting based on the type of content on that station.

Figure 4:
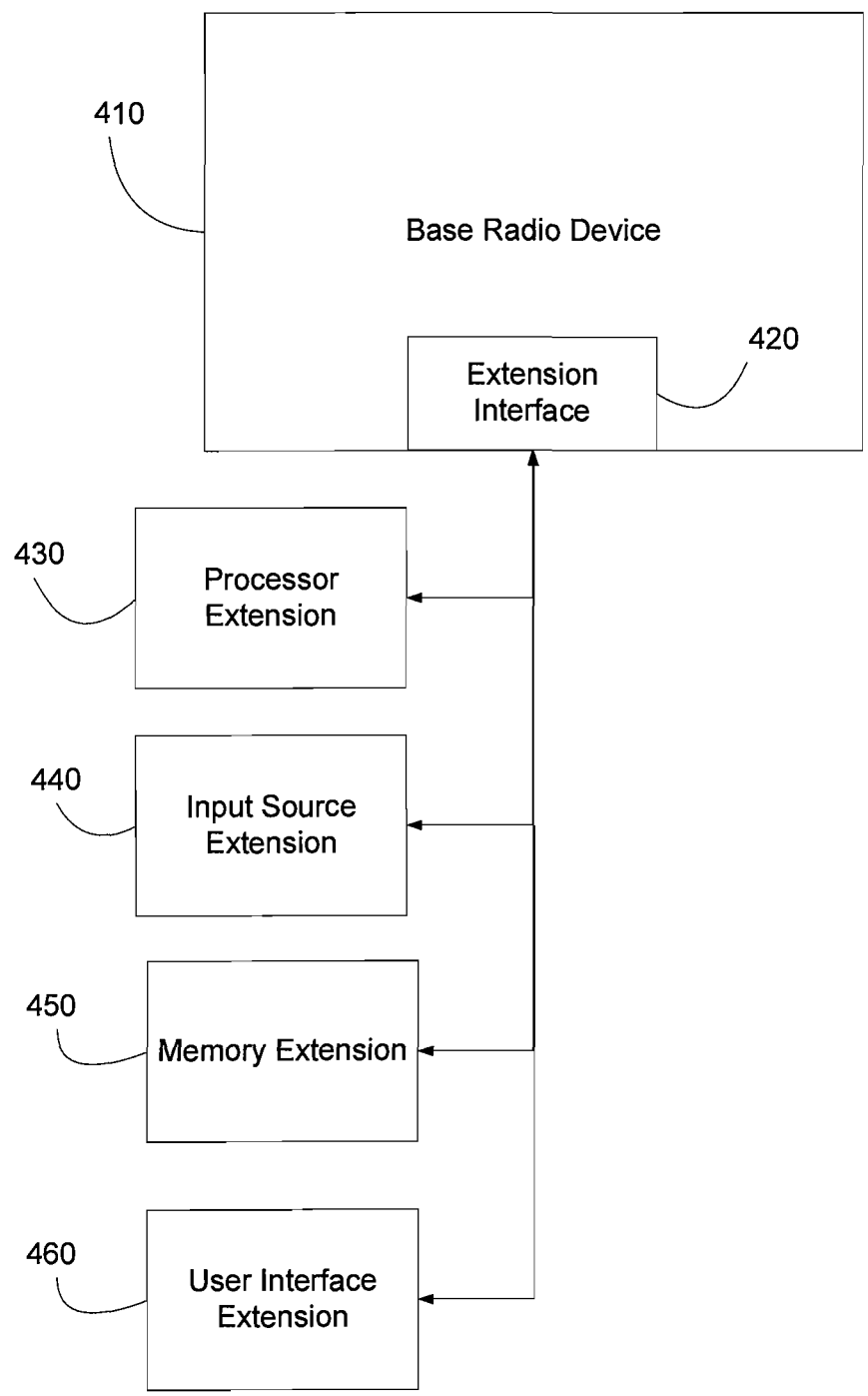
FIG. 4 shows a block diagram of an embodiment of a radio device that supports extension modules.

FIG. 4 shows a block diagram of an embodiment of a radio device that supports extension modules. Radio 410 may be similar to the radio shown in FIG. 1. If radio 410 becomes limited during its use, it may be extended to provide additional capabilities while maintaining its core functionalities. Device 410 may include extension interface 420, which may be any suitable interface port, such as a PC Card interface, a USB interface, or a Bluetooth interface. Interface 420 may allow one or more devices to be connected to radio 410 and augment its capabilities (or replace built-in capabilities). In some embodiments, multiple extension devices may be connected simultaneously over interface 420.

Device 430 is a processor extension module. This extension may augment or replace processor internal to base device 410, such as digital signal processor 150. Processor extension device 430 may provide additional processing power that is capable of simultaneously processing more inputs, or of processing the existing number of inputs at a higher audio quality. Module 430 may include multiple processors configured to allow suitable partitioning of processing functions. If desired, processor extension module 430 may include additional memory and other circuits.

Device 440 is an input source extension. This extension may provide the capability to monitor and listen to one or more additional types of sources. Input source extension module 440 may include any suitable antennas, analog-to-digital converters, DMA circuits, cache memory, tuning circuits, decryption circuits, and any other suitable circuits. Device 440 may be configured to provide access to a type of radio signal that was not well known or for which business agreements were not available at the time of manufacture of radio 410. For example, a standard for radio broadcast at 700 MHz may be published after device 410 is built and sold, and extension module 440 may provide access to input signals following that standard.

Device 450 is a memory extension. This extension provides additional storage capability to radio 410. It may include any suitable type of memory, such as flash memory, dynamic memory, static memory, or disk memory. This module may provide radio 410 with the capability to store audio data for more stations or to store more audio data for each monitored station.

Device 460 is a user interface extension. This extension may provide the user the ability to interact with radio device 410 in different ways, for example adding voice or gesture control to a base radio that may include button inputs.

Any other suitable extension devices not shown here may be supported as well. Preferably, interface 420 is designed to an open standard such that extension devices can be designed and built after radio 410 is in use by an end consumer. If desired, extension modules may be designed and manufactured by one or more companies that are different from the company that designed and manufactured radio 410.

By implementing the virtually infinite radio aspects of this invention, several feature advantages are made available over finite hardware tuner implementations. For example, because virtually all available stations can be monitored, the user does not have to set favorite stations in order to use the enhanced features. The user can select a station that may not have previously been selected for output, and may immediately skip back in time to hear content that was missed on that station. Selecting such a station may provide a much quicker response time, since, in one embodiment, it involves merely selecting a different playback buffer, rather than actually retuning. When the VIR is put into scan mode, stored content may be available for at least one or all of the available stations, making each switch quicker, and providing a greater amount of previously stored content for any station if the listener pauses or stops the scan at any station.

A VIR may be cheaper to manufacture than a multi-tuner radio with hardware tuners. Although the DSP to provide the simultaneous tuning and compression of virtually all stations may be more expensive than the processor needed for a radio with a fixed number of tuners, that cost may be more than made up for by the cost of multiple hardware tuners.

By providing an extension interface, the cost of the VIR may be kept down, and listeners with more requirements may pay for the features and capabilities they need. As faster processors and larger memory devices are made available and affordable, they may be used to extend the capabilities of the base VIR without having to replace it. New radio broadcast protocols that were not available at the time of manufacture may also be supported using this extension interface.

As shown here, by using a powerful digital signal processor and software-defined radio tuning with adaptive access and compression parameters, a radio has been defined that can simultaneously monitor and record a virtually unlimited number of radio stations and allow a listener to access the content of these stations, although it may be at a reduced quality and/or reduced storage capacity for at least one, some, or (virtually) all of the stations. By including an open extension interface, any lacking capabilities to monitor specific types of sources or limits on the number of stations or amount of data stored for each can be rectified after the radio has been sold and put into use or otherwise deployed.

An initially manufactured unit may for example provide adequate audio quality and quantity for the number of stations that are currently available in a typical metro area (e.g., New York, Washington DC, Denver, Baltimore, Hartford, Cleveland, Harrisburg, etc.) today, and that extensions added over time may adequately support station expected to be added in the future as new types of sources are conceived and made popular.

In some embodiments for implementing a VIR, the apparatus may be configured to tune or receive and record each and every radio input (e.g., simultaneously) bounded by the hardware and/or software capability (e.g., up to a threshold capability such as 99%, up to a sufficient margin for safety or sufficient device operation, or subject to other demands on the apparatus) of the platform on which the VIR is implemented. Thus the apparatus may implement a sequential, simultaneous, and/or random process by which it commences tuning and recording until all currently available inputs are monitored, device performance capacity is reached, or a preset threshold is reached. If desired, configuration options can be implemented such as to limit the number of stations (e.g., 100 channels total, 20 FM channels, 5 AM channels, and/or 30 Satellite channels). If desired, the configuration options may represent device capabilities. A user may also have the option to select one type of input (e.g., FM radio), combinations of inputs (e.g., FM and satellite), or all inputs. A database or file may be implemented to track identification information for the many stations monitored. After a first set of inputs are being monitored (e.g., tuned based on having adequate signal strength), the apparatus may continue the process of identifying additional inputs to add to the monitored channels such as by continuously, periodically, randomly, or by combinations thereof to seek to add additional inputs (e.g., channels) so that for example the apparatus can be current in monitoring all available channels (e.g. subject to device capabilities and/or threshold settings).

If desired, a VRI can be a plug-in module that can be implemented on different platforms such as a mobile handheld device or a car radio to implement one or more features illustratively described herein. As such, it can be third party add-on feature.

It is to be understood that other embodiments can be utilized and structural changes can be made without departing from the scope of the present invention.

What is claimed is:

1. A radio playback device that simultaneously and continuously monitors and records substantially all available radio stations without previous selection for output by a user, that records stations based on the presence or quality of their signal, that suspends stations from recording based on loss of signal and resumes recording based on resumption of signal, and that changes its processing parameters based on processor usage, wherein the processing parameters are selected from sample frequency, sample size, compression algorithm, and compression parameter.

2. The radio of claim 1 that uses software tuners.

3. The radio of claim 1 configured to use multiple processors.

4. The radio of claim 1 that allows a listener to access radio content recorded while a signal was available at a later time when no signal is available.

5. The radio of claim 1 that adapts its memory usage based on the memory requirements of stations being recorded.

6. The radio of claim 1 in which stations are prioritized.

7. The radio of claim 6 in which the prioritization is based on a user priority.

8. The radio of claim 6 in which the priority is based on a user setting a station as a favorite.

9. The radio of claim 6 in which the priority is based on a user deleting a station.

10. The radio of claim 6 in which the priority is based on listening habits of a user.

11. The radio of claim 6 in which the priority is based on a type of content.

12. The radio of claim 6 in which processing parameters, memory allocation, or recording status of an individual station is modified based on its priority.

13. The radio of claim 1 further configured to allow a user to adjust a processing parameter of memory allocation for an individual station.

14. The radio of claim 1 further configured with an extension interface.

15. The radio of claim 14 further configured to support a processing module to be connected using the extension interface, said processing module augmenting the processing capabilities of the radio.

16. The radio of claim 14 further configured to support a memory module to be connected using the extension interface, said memory module augmenting the storage capabilities of the radio.

17. The radio of claim 14 further configured to support an input source module to be connected using the extension interface, said input source module augmenting the radio reception capabilities of the radio.

18. The radio of claim 14 further configured to support a user interface module to be connected using the extension interface, said user interface module augmenting the user input and/or output capabilities of the radio.

19. A method for recording a plurality of radio stations, comprising:
based on a processing parameter, simultaneously and continuously monitoring and recording a plurality of radio stations without previous selection for output by a user; and
changing the processing parameter based on a processor usage, wherein the processing parameter is selected from sample frequency, sample size, compression algorithm, and compression parameter.

20. The method of claim 19, wherein simultaneously recording further comprises:
performing at least one recording action comprising:
scanning an input source for at least one of the plurality of radio stations;
tuning the scanned radio station;
demodulating the scanned radio station;
compressing audio data from the scanned radio station; and
storing a version of the audio data; and
recording the processor usage for adapting based on performed recording action.

21. The method of claim 19, further comprising:
providing an interface to perform at least one interface action comprising:
selecting a favorite station;
deleting a station;
monitoring a listening habit;
determining a content type; and
providing an adjustment of a parameter for at least one of the plurality of radio stations.

22. The method of claim 19, further comprising:
suspending a radio station from the recording based on a loss of a signal; and
resuming the recording based on a resumption of the signal.

23. The method of claim 19, further comprising: providing an access to a radio content recorded while a signal was available, if the signal is unavailable.

24. The method of claim 19, further comprising: adapting a memory usage based on a memory requirement of a station being recorded, wherein recording is further based on a memory usage.

25. The method of claim 19, further comprising: prioritizing the plurality of stations.

26. The method of claim 19, further comprising: modifying a radio parameter based on a priority of the radio parameter, wherein the radio parameter comprises a processing parameter, a memory allocation, or a recording status of an individual station.

27. The method of claim 19, further comprising: providing an adjustment of a processing parameter of a memory allocation for an individual station.

28. The method of claim 19, further comprising: modifying a deployed device configured to perform the simultaneous receiving step with an extension module.

29. A non-transitory, processor readable medium for recording a plurality of radio stations, comprising instructions that when executed by a processor causes the processor to perform the steps of claim 19.

30. A system for recording a plurality of radio stations, comprising:
- an analog-to-digital converter configured to receive a radio signal source and to convert the radio signal source to a digital data stream;
- a processor in communication with the analog-to-digital converter, wherein the processor is configured to perform actions comprising:
  - based on a processing parameter, simultaneously and continuously monitoring and recording a plurality of radio stations without previous selection for output by a user; and
  - changing the processing parameter based on a processor usage, wherein the processing parameter is selected from sample frequency, sample size, compression algorithm, and compression parameter.

31. The system of claim 30, wherein the processor is a digital signal processor.

32. The system of claim 30, further comprising: a user interface in communication with the processor.

33. The system of claim 30, further comprising: an output circuit in communication with the processor.

34. The system of claim 30, further comprising: a direct memory access component in communication with the analog-to-digital converter, wherein the direct memory access component is configured to store the digital data stream into a memory.

* * * * *